Patented Jan. 30, 1951

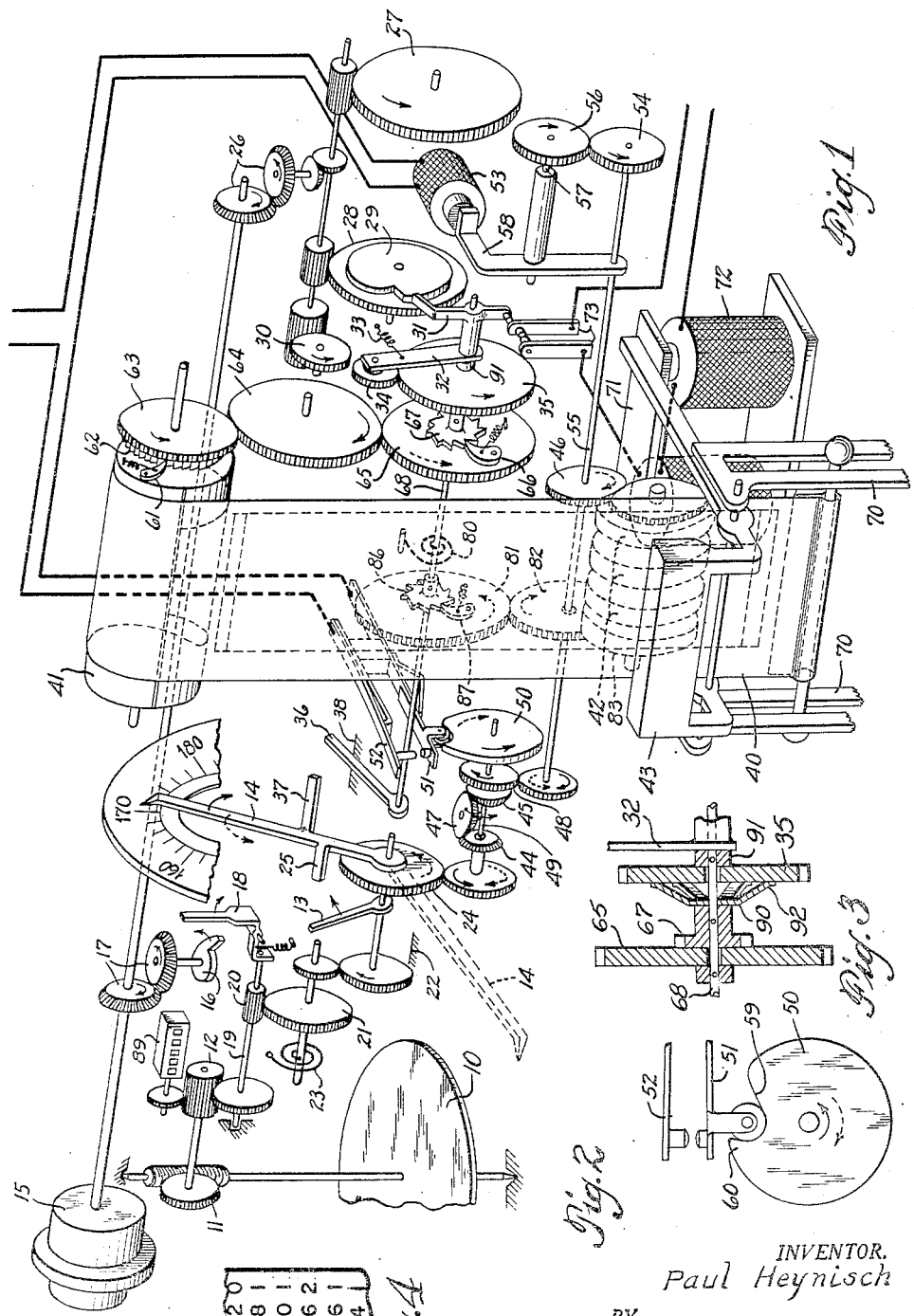

2,539,835

UNITED STATES PATENT OFFICE 2,539,835

MAXIMUM DEMAND METER RECORDING SYSTEM

Paul Heynisch, Zug, Switzerland, assignor to Landis & Gyr, A-G., Zug, Switzerland, a corporate body of Switzerland Application May 15, 1947, Serial No. 748,273

4 Claims. (Cl. 346—30)

The present invention relates to maximum demand meters and more particularly to an improved recording maximum demand meter.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

The present application is a continuation-in-part of my copending application Serial Number 466,141 filed November 19, 1942, now abandoned.

The known maximum demand meters used for ascertaining the peak demand, particularly of electric generating plants, are usually provided with a pusher, driven by a meter disc, for a maximum pointer with or without recording or printing mechanism, and this pointer or the corresponding recording or printing mechanism is released for a short while from the counter at regular intervals (recording periods) of say fifteen minutes through the medium of a timing element, in order to return the pointer to its initial position for recoupling.

With common maximum demand meters, the peak demand mean value for each recording period which occurred within a reading or valuation period, say one month, can only be read on the maximum device, as such meters are merely indicating instruments which have to be read and noted on the site by a meter reader after every billing period, and he then pushes the pointer back to zero by hand. With the recording or printing maximum demand meters the mean value of the load during each single recording period is usually marked on a tape or paper roll or the like in the form of a line and/or figure. This recording tape generally has to be changed every month or so. In contrast to the usual peak demand recorders, reading need not take place where the meter is located, but the recording tape containing all the necessary data can be scrutinized or valuated anywhere and at any time.

The usual peak demand meter or maximum counter is undoubtedly cheap, but comparatively imperfect, whereas the recording or printing maximum demand meter which practically answers any requirements, is expensive.

The present invention relates to a practical solution of the demand measuring problem with regard to requirements imposed thereon and price, and is intermediate the two kinds just mentioned, the meter hereinafter described being not much more expensive than any ordinary counter and yet comparable in respect of its properties and merits with recording and/or printometers.

The invention relates in particular to a maximum demand meter with at least one pusher driven by a meter armature and acting on a maximum pointer, the pusher being momentarily disengaged at regular intervals from the meter disc, restored to its initial position, and recoupled.

In its main features the invention is distinguished by the fact that a printing mechanism is provided which prints the value of the respective peak point on a tape or similar device immediately prior to the resetting of the maximum pointer, in conjunction with a time-controlled device automatically working the maximum pointer back to zero after expiration of its reading or valuation period from the highest point reached within this period.

In the accompanying drawings there is shown in Figure 1 for the purposes of illustration only one diagrammatic embodiment of the invention, and Figures 2 and 3 show details thereof.

Figure 4 is a showing of a sample record as produced by the device of the invention.

The meter armature or driving disc 10 of the meter is conventionally connected, by means of gearing 11 and a pinion 12, with the counting mechanism 89 indicating the total consumption. The driving disc is also connected through pinion 12 with a pusher 13 which advances a maximum indicator 14, and the pusher is periodically disengageable from the driving disc by acting of the time element 15. The periodical disengagement takes place by means of a precision tooled cam 16 which is rotated by the synchronous motor 15 through the gearing 17, and the cam periodically pivots to the right a bent lever 18 which lifts the right end of the tiltable shaft 19, so that the pinion 20 is disengaged from the gear 21 through which pusher 13 is driven. The pusher 13 returns to its initial position against stop 22 through the expanding action of the spiral spring 23. The disengagement is timed to take place at the end of a period of registration of, for example, 15 minutes.

The maximum pointer 14 indicating the peak demand is rigidly connected with the wheel 24 mounted friction-tight on its stationary axis and has an arm 25 which projects into the path of pusher 13.

With the synchronous motor 15 which serves as the time element there is connected also the gearing 26, which continuously drives on the one hand a gear 27 and on the other hand a gear 28 carrying a precision tooled cam 29, and a gear 30. The lever 31 bears against the cam 29 and is rigidly connected to a coupling arm 32, which latter is biased by the spring 33 to press lever 31 against the cam. Said arm 32 carries at its free end the gear 34, which is continuously engaged with the gear 35 and is engaged with the gear 30 only when the lever 31 drops into a low place of the cam 29. As will be explained hereinafter in greater detail, this arrangement causes a pusher 36 to be turned, in the path of which there projects a second arm 37 of the maximum indicator 14. When at rest the pusher 36 lies against the stop 38. The gear ratio between the cam gear 28 and the synchronous motor 15 is such that the pusher 36 turns the maximum indicator 14, by means of the arm 36, into zero position (position of indicator 14 shown in dotted lines) only at the end of a reading or evaluating period, and thus performs the work which the operator would otherwise have to do by hand at the end of a reading peroid.

Immediately prior to the resetting of maximum pointer 14 by pusher 36 after a reading or valuation period, the maximum value corresponding to the maximum deflection of the pointer during such averaging period is printed on a tape of paper or the like.

The printing mechanism consists essentially of a recording face 40 made of paper or other material suitable for printing arranged on a winding roll 41, whereby said face or tape is drawn between a set of numbered type wheels 42 and a hammer-shaped printing platen 43.

The printing mechanism is connected to the maximum train as follows: The maximum pointer 14 is coupled through the wheel 24 with the sun wheel 44 of a differential gear assembly, the second sun wheel 45 being connected with the set of type wheels 42 by means of a driving wheel 46, through gear 48 connected to gear 45, said gears being freely rotatable on shaft 49. Mounted on the axis 49 of the planetary wheel 47 is a cam disc 50, shown in detail in Figure 2. This cam disc cooperates with the contact arm 51 which, together with the other contact part 52, can close the circuit of an electro-magnet 53. On the shaft 55 which supports the driving wheel 46 there is arranged another wheel 54 geared to a clutch wheel 56, the axis 57 thereof being connected to the armature 58 of the electro-magnet 53. The wheel 56 meshes permanently with the toothed wheel 54 on shaft 55 and can be coupled periodically with the wheel 27 which is driven by the synchronous motor 15. The cam disc 50 is precision tooled and is provided with a notch or recess 59 so designed that upon its rotation, in the direction indicated by the dotted arrow thereon in Figure 2, projection 60 engages the contact arm 51, whereas upon rotation of the cam disc in the opposite direction in the direction of the solid arrow the contact arm 51 can run freely on the periphery of the disc 50. Cam 50 is so adjusted with respect to cam 29 that the type wheels 42 will act before magnet 72 is actuated. Thus, the setting of the type wheels will occur before the printing operation takes place. This sequence is further facilitated by a proper spacing between gears 56 and 27.

The feed device for the recording tape involves the following parts: The rigidity built-in winding up-and-off roll 41 is connected through pawl 61 and ratchet wheel 62 on gear 63, through gears 64 and 65, the latter carrying pawl 66, with the ratchet wheel 67 and wheel 35 freely secured to shaft 68 which in turn connects the synchronous motor 15 with the reset pusher 36. A collar 31 is located at the right side of the gear 35 and is rigidly secured to the shaft 68 as shown in Figure 3. The disc 90 is a star shaped frictional disc having its arms 92 press against the left side of the gear 35. The action of this disc causes a frictional engagement to take place against the hub of the ratchet wheel 67. A similar reaction takes place between the collar 91 and the other face of gear 35. This friction coupling between the gear 35 and the ratchet wheel 67 prevents the motor 15 from being locked while setting back pointer 14. The wheel 65 carrying the pawl 66 arranged to be engaged by wheel 67 rides freely on the axis 63. In the illustrated form of embodiment the paper tape 40 hangs between the type wheels 42 and the hammer-platen 43 the end riding in a guide 70 in which it is vertically arranged at a short distance from the circumference of the type wheels 42. The paper tapes, which are supplied loose, are tapered at their top end, so that they can be inserted into a corresponding slot on the roll and wound thereon. If the tape is short enough it gets a loop at its bottom end through which a rod can be passed to serve as guide and weight. The hammer 43 is pivotally supported on the top of the guide 70 and is connected to an armature 71 cooperating with the electro-magnet 72. The latter receives an appropriate impulse of current by means of a switch 73 which is actuated by an arm fastened to the member connecting arms 31 and 32, at the beginning of the resetting motion of the pusher 36. The shaft 68 of the driver 36 is turned back against the stop 38 by means of a coiled spring 80. The gear 81 is carried loose on the shaft 68, and the gear 82 engaging with it is carried loose on the shaft 55. The latter serves to drive the first type wheel 83, which is reserved for the registration of the date.

In order to make clear the action of the device according to the invention it is presumed that from the position shown in Figure 1 the counting train pusher 13 carries the maximum pointer from the shown scale position 170 to position 180 in the direction of the solid line, and the reset pusher 36 is at this time in its reset position against stop 38.

Together with the pointer 14, the gear 24 which is rigidly connected therewith is moved simultaneously. The latter gear turns the sun wheel 44 while the type wheels 42 and therefore also the sun wheel 45 are stationary. The consequence is that the planet wheel 47 and the cam 50 move in the direction indicated by the arrow drawn in solid line, whereby the contact 51, 52 is closed. The magnet coil 53 attracts its armature 58 and switches the gear 56 and shaft 55 respectively with the driving gear 46 to the gear 27, thus connecting it to the motor 15. Thus, as soon as the pointer 14 is moved on by the driver 13 the type wheel drive 46 is connected to the motor 15 by means of the members 53, 56, the type wheels 42 are thereby switched forward in accordance with the movement of the maximum pointer 14, and the numbers of the type wheels opposite to the paper web 40 thus indicate a value corresponding to that which the maximum pointer shows at the corresponding moment.

In connecting the shaft 55 to the motor the sun wheel 45 of the differential now rotates also, namely in the direction of the arrow drawn in dotted line on cam 50. The consequence of this is that the cam 50 is now turned back until contact 51, 52 is opened again. The device described has the character of a trailing arrangement.

Moving back the maximum pointer 14 to its position against stop 22 at the end of a reading or evaluation period is started by the dropping of lever 31 into the notch of the cam 29. In the first place this causes the switch 73 to be closed for a brief period and the magnet 72 to be energized, with the result that when the armature 71 is attracted the hammer 43 strikes against the registration strip 40 pressing the latter against the type wheel 42. The coupling lever 32 is swung around together with the lever 31, and the gear 34 is thus connected to gear 30 driven by motor 15 which drives it continuously. Thereby the ratchet wheel 67 is turned in the direction of the arrow shown in dotted line on the gear 65, consequently carrying along, by means of the pawl 66, the gear 65 in the same arrow direction. This operates the paper feed by means of the gears 64, 63 and the ratchet wheel 62. The hub of ratchet wheel 67 and gear 35 being rigidly connected to the shaft 68, the rotation of said gears also carries along the shaft 68, in opposition to the action of the spring 80. The shaft 68 begins to move only after the magnet 72 has again been de-energized and the printing operation has taken place already. This results from adjusting the operation of switch 73 and the spacing between gears 34 and 30 such that switch 73 operates before gears 34 and 30 mesh. Shaft 68 now also carries along the ratchet wheel 86 rigidly arranged thereon and the driver 36 in the direction of the arrow shown in dotted line on pointer 14. The driver 36 effects the intended setting back of the maximum pointer 14 to its zero position by pressing against the lug 37. The pusher 36 and switch 73 are so adjusted that the pusher will only press against the lug 37 after the printing operation has occurred and the switch 73 has opened. Furthermore, cams 16 and 29 are adjusted with respect to each other so as to permit the pusher 13 to be released just before pusher 36 presses against the lug 37 of indicating element 14. The spacing of gears 34 and 30 is also an aid in effectuating this sequence. However, the two gears 81 and 82 carried loose on their shafts are simultaneously turned by means of the pawl 87 in the direction of the arrows shown in dotted line on gears 81 and 82. Thereby the date type wheel 83 is advanced one place by means of the gear 82. In setting back the maximum pointer 14 it should be observed that the gear 24 which is rigidly connected to the pointer, likewise turns in the direction of the arrow drawn in dotted line thereon. This shifts back the planet wheel 47 of the differential gear, which is to say that the cam 50 has a tendency to turn in the direction shown in dotted line thereon. As this is impossible on account of the catch 60, cam 50 and with it the planet wheel axle 49 stand still during the setting back of the maximum pointer 14, and therefore the sun wheel 45 and also shaft 55 and the driving gear 46 turn in the direction indicated by the arrow drawn in dotted line on wheel 46. The type wheels are now turned back to zero by the driving gear 46.

Shortly after the driver 36 has set back the maximum pointer to zero, lever 31 runs again out of the notch of the cam 29, whereby gears 30 and 34 disengage again. Under the action of the spring 80, shaft 68 and with it the driver 36 are turned back again until driver 36 strikes the catch 38. The ratchet wheel 67 and the gears 34 and 35 then run without load, while gears 65 and 81 stand still because the pawls 66 and 87 are now becoming disengaged.

Upon completion of the printing, the operation is started afresh, i. e., within the new reading or valuation period the type wheels 42 stand at all times with a value in front of the paper path which corresponds to the value indicated by the maximum pointer. At the end of the valuation period, i. e., upon resetting the maximum pointer the paper feed takes place after printing the corresponding maximum value.

The carrier of the records may also suitably consist of some transparent substance such as "Plexiglas" and, may have a surface which permits easy erasing the records. If transparent discs or tapes are used as record bearer, this can be preferably arranged behind an inspection window of the meter in such a way that the recording on the tape and the interior of the meter are visible.

The main features of the invention are these:

Unlike the known meters this maximum demand meter does not have to be set to zero every month by the computer or official of the works, the reset being automatically performed by the timing element provided (synchronous motor, clock or the like), whereby each time with the return movement of the maximum pointer the position is marked on a recording tape of paper. Contrary to the hitherto known recording maximum meters the recording of the maximum is established by reading periods (e. g. one month) and not by registering periods or clock times (e. g. fifteen minutes). The registering period and therewith the corresponding abscissa datum is not found on the recording tape according to this invention. With the reset function per reading or valuation period, according to the invention, a recording tape of some 36 mm. in length suffices for a whole year. The computer need not read the instrument punctually to the end of each reading period as the recording is automatic.

The whole apparatus is so arranged that it can be built-in in place of the standard maximum counting device and the upper part of the casing is provided with a door for changing the small recording tape.

It will be understood that the embodiment hereinbefore described has been given only by way of example and that the details thereof may be modified without departing beyond the scope of the invention as set forth in the appended claims.

What I claim is:

1. A maximum demand meter including in combination a maximum demand indicating element, means for operating upon said indicating element periodically to show maximum power consumption during a reading period comprising a plurality of shorter recording periods, a time motor, a differential gear assembly, a cam rotatable in accordance with the relative movement of the gears in said assembly, registering means for showing the maximum power during each said reading period, said indicating element, cam and registering means being interconnected through said differential gear assembly, a normally blocked relay circuit actuated by said cam, and means actuated by said relay circuit interconnecting said time motor and registering means for causing said registering means to give the maximum power reading.

2. A maximum demand meter including in combination a maximum demand indicating element, means for operating upon said indicating element periodically to show maximum power consumption during a reading period comprising a plurality of shorter recording periods, a time motor, a differential gear assembly having sun gears loosely coupled and a planet gear rigidly coupled to a common shaft, a cam rigidly coupled to said shaft and rotatable in accordance with the movement of said planet gear, registering means for showing the maximum power during each, said reading period said indicating element and registering means being connected to respective ones of said sun gears, and a normally blocked relay circuit actuated by said cam so as to couple said registering means to said time motor.

3. A maximum demand meter including in combination a maximum demand indicating element, means for operating upon said indicating element periodically to show maximum power consumption during a reading period comprising a plurality of shorter recording periods, a time motor, a differential gear assembly having sun gears loosely coupled and a planet gear rigidly coupled to a common shaft, a cam rigidly coupled to said shaft and rotatable in accordance with the movement of said planet gear, said cam being shaped so as to block in one direction any movement from its normal resting position, registering means for showing the maximum power during each said reading period, said indicating means and registering means being connected to respective ones of said sun gears, and a normally blocked relay circuit actuated by said cam so as to couple mechanically said registering means to said indicating element and said time motor.

4. A maximum demand meter including in combination a maximum demand indicating element, means for operating upon said indicating element periodically to show maximum power consumption during a reading period comprising a plurality of shorter recording periods, registering means for showing the maximum power consumption, a time motor, a cam, a differential gear assembly interconnecting said indicating element, registering means and cam, a normally blocked relay circuit actuated by said cam, and rotatable means actuated by said circuit to couple said registering means to said time motor whereby said registering means are moved into a position corresponding to the maximum power, said rotating means simultaneously acting on said differential assembly so as to return said cam to its normal position and recording means for permanently recording the maximum power indicated on said registering means.

PAUL HEYNISCH.

REFERENCES CITED

The following references are of record in the file of this patent:

UNITED STATES PATENTS

| Number | Name | Date |
| --- | --- | --- |
| 1,133,597 | Wilson | Mar. 30, 1915 |
| 1,141,380 | Conrad | June 1, 1915 |
| 1,504,082 | Schuchardt | Aug. 5, 1924 |
| 1,708,972 | Lanphier et al. | Apr. 16, 1929 |
| 1,781,588 | Marcellus | Nov. 11, 1930 |
| 2,149,410 | Weisman | Mar. 7, 1939 |
| 2,160,415 | Emens | May 30, 1939 |
| 2,247,108 | Witherow | June 24, 1941 |
| 2,305,504 | Wagner | Dec. 15, 1942 |